Figure 5:
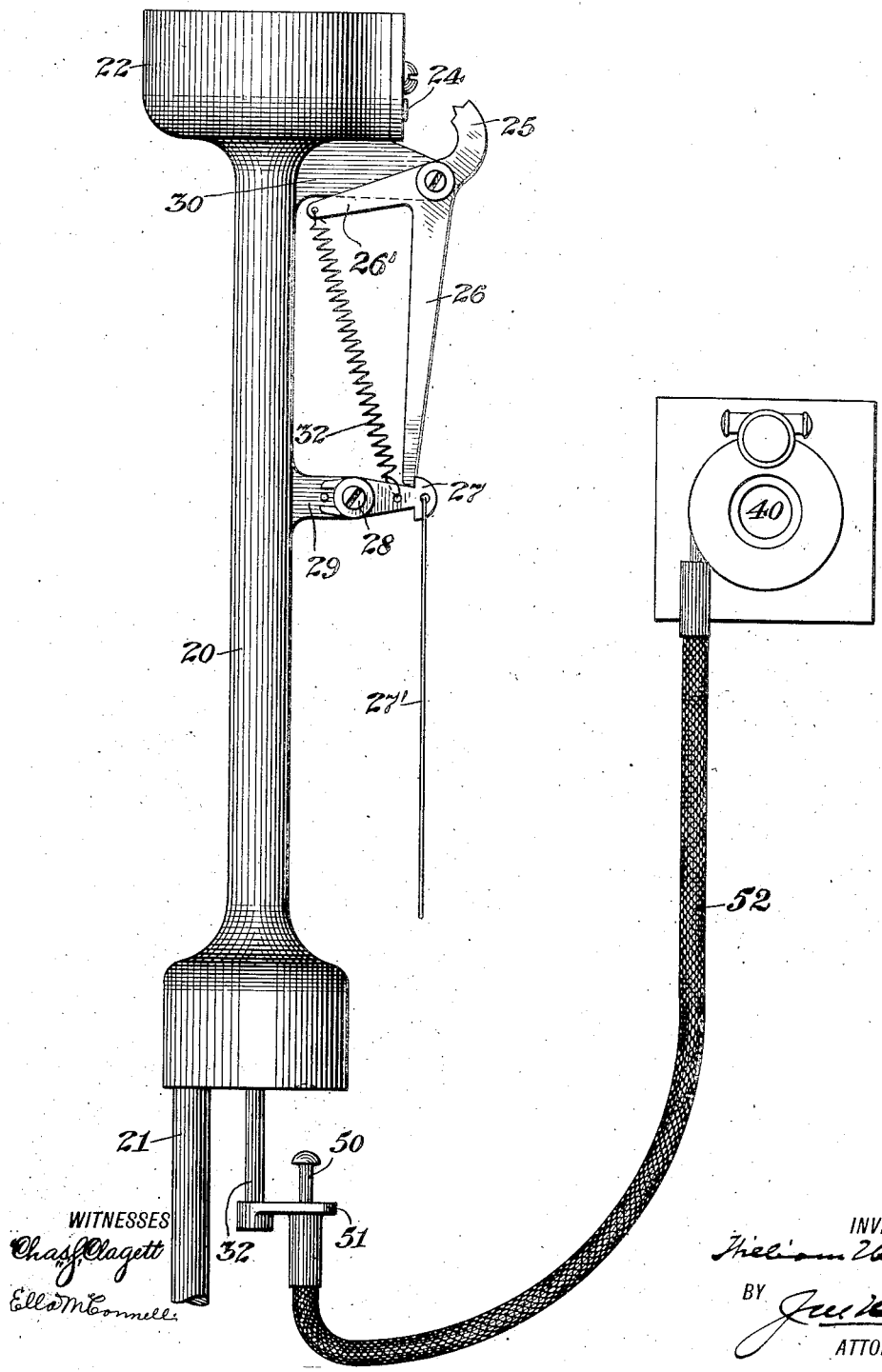

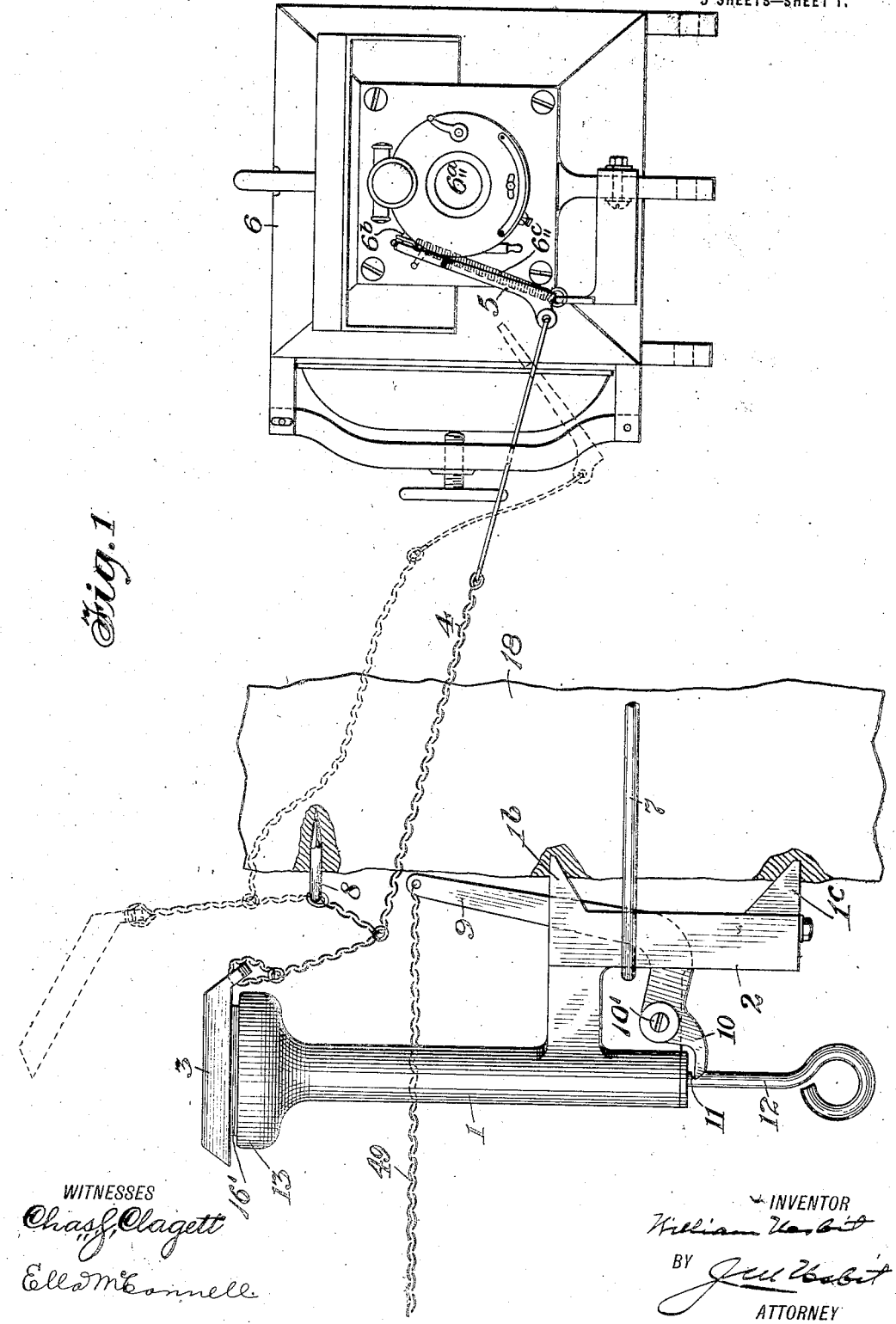

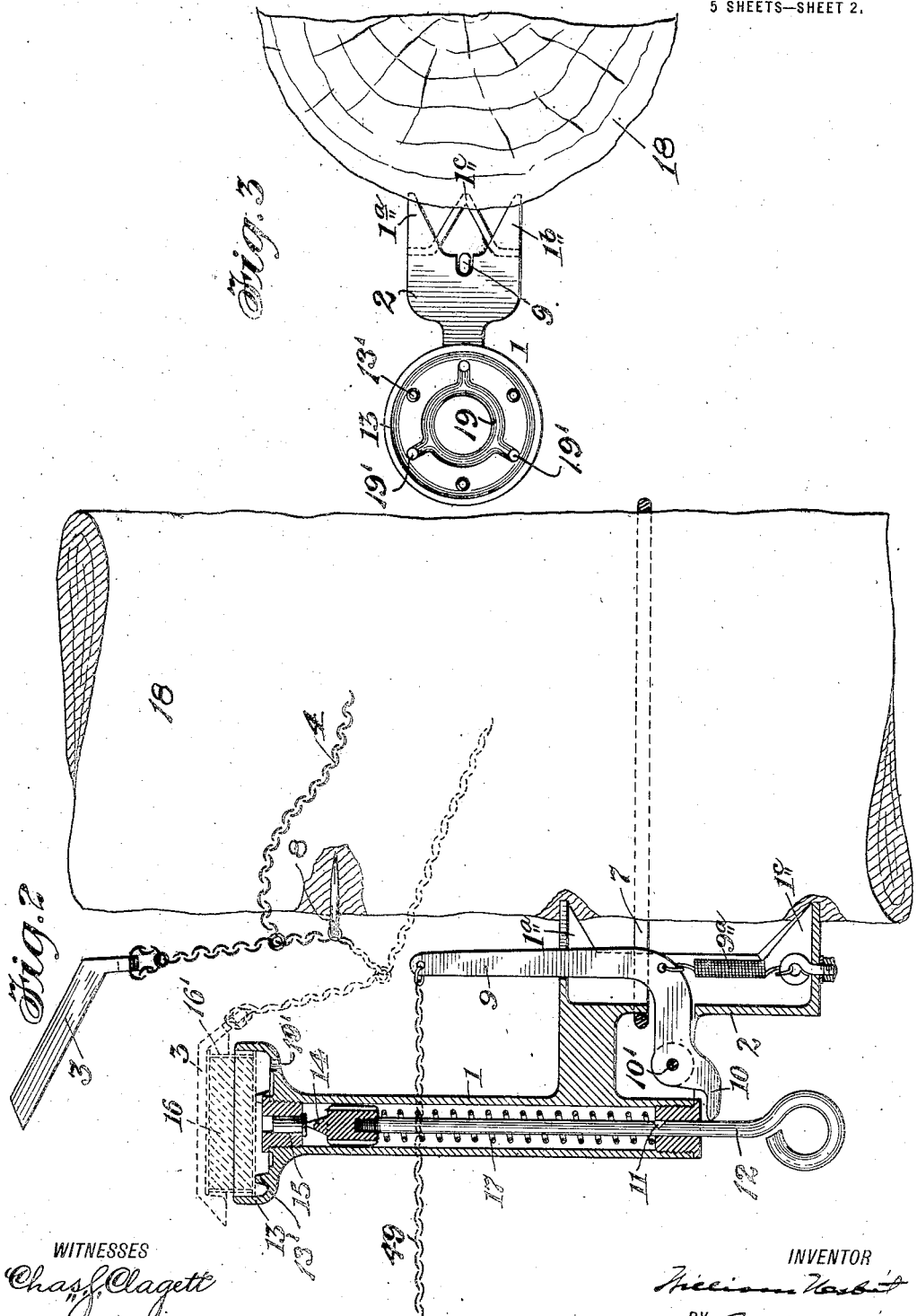

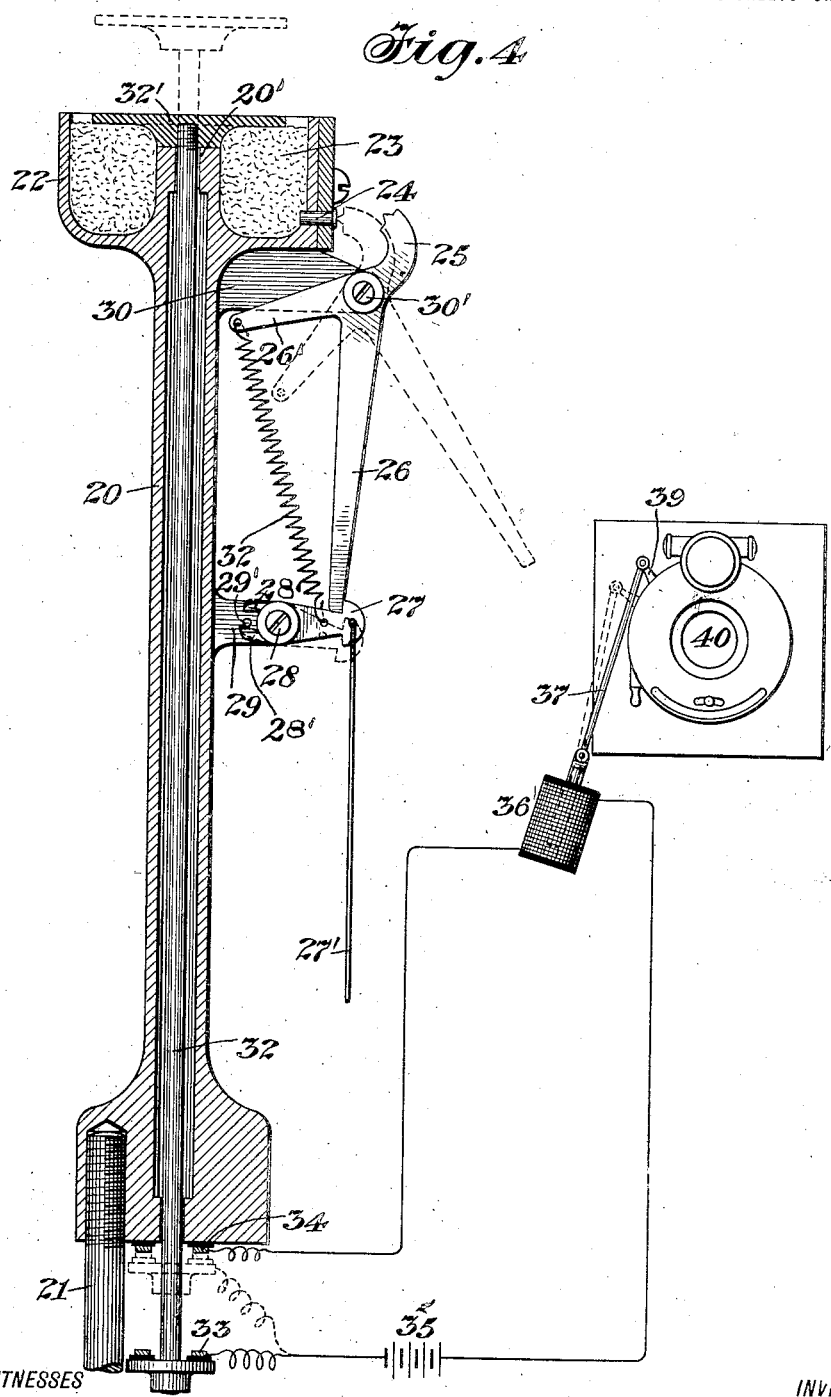

W. NESBIT.
FLASH LIGHT PHOTOGRAPHY.
APPLICATION FILED SEPT. 11, 1913.

1,152,203.

Patented Aug. 31, 1915.
5 SHEETS—SHEET 4.

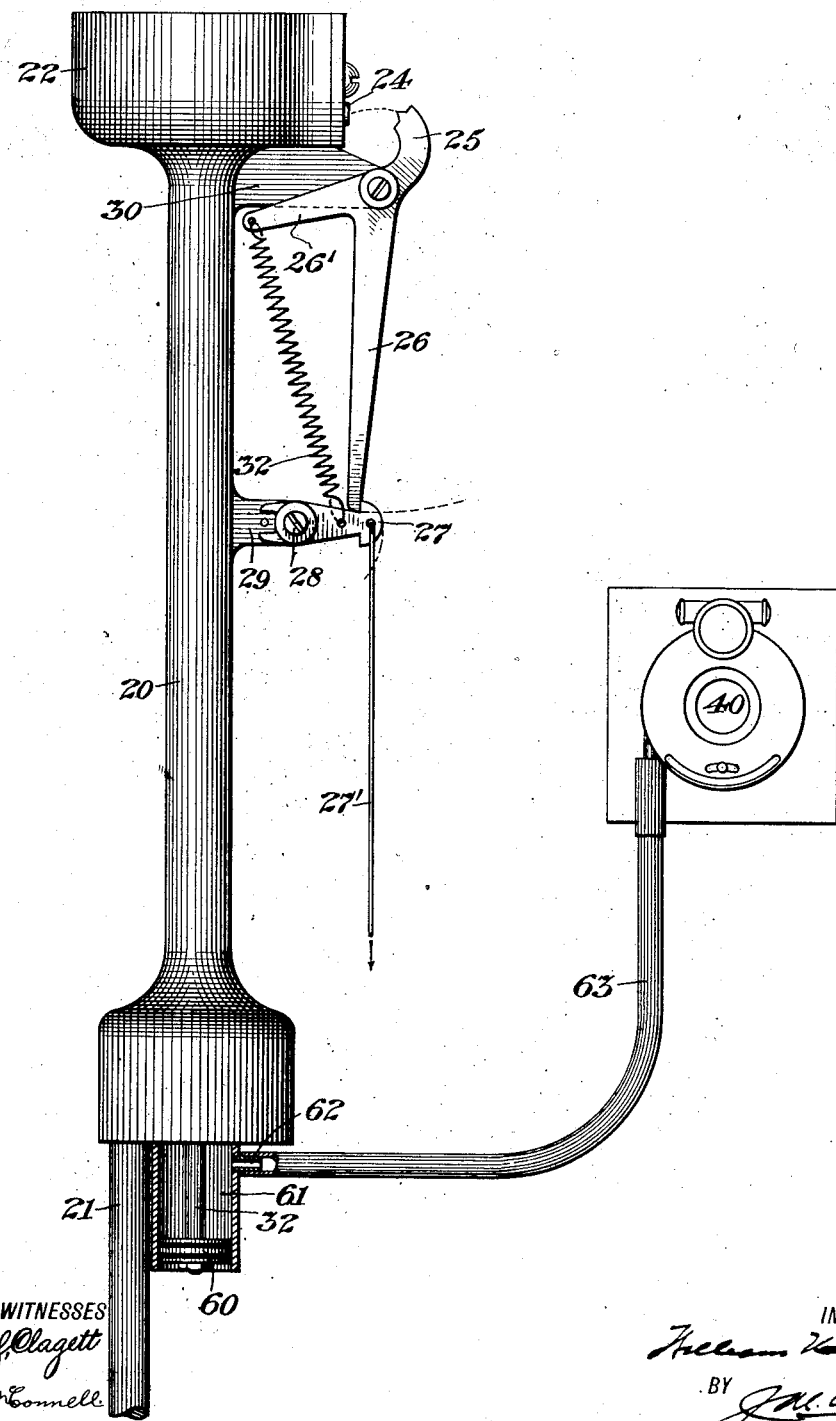

UNITED STATES PATENT OFFICE.

WILLIAM NESBIT, OF BALTUSROL, NEW JERSEY.

FLASH-LIGHT PHOTOGRAPHY.

1,152,203.   Specification of Letters Patent.   Patented Aug. 31, 1915.

Application filed September 11, 1913. Serial No. 789,354.

*To all whom it may concern:*

Be it known that I, WILLIAM NESBIT, a citizen of the United States, and resident of Baltusrol, in the county of Union and State of New Jersey, have invented certain new and useful Improvements in Flash-Light Photography, of which the following is a specification.

This invention relates to the art of flash-light photography, and more particularly to photographing moving objects which necessitate using a fast shutter, and the primary object is to so synchronize the operation of the camera shutter with the instant of greatest luminosity of the flash that the exposure is effected only at the moment of maximum light. If the flash were an unchanging factor in the sense that the instant of greatest luminosity always occurs at exactly the same period following inception of the explosion, the problem would not be difficult. Indeed, prior to my investigation, means have been proposed for synchronizing the movements of the flash exploding means and the shutter. But unavoidable variations in the speed of the flash-producing explosive renders it impracticable to rely on a fixed time interval between an impulse that produces the explosion and an impulse that operates the shutter. If a perfect impression is obtained it is because the shutter happened to be operated at the instant of maximum light. Another operation under seemingly the same conditions is liable to result in either a premature or a belated exposure, with correspondingly unsatisfactory results.

The speed of flashlight powders varies usually between one-fifth and one-fortieth of a second, the average speed being approximately one-twentieth of a second, which means that one-twentieth of a second elapses between the time the powder is ignited and the light disappears. And during this very brief moment the light varies in intensity, increasing to its maximum and then decreasing. Variations in the speed of different charges of powder taken from the same package result because of atmospheric changes, such as are experienced in the open air. The explosion is more rapid when the surrounding atmosphere is dry than when the air is more or less saturated, as during damp or rainy nights.

With the invention herein proposed there is no fixed time interval between igniting the charge and operating the shutter. The interval may be relatively long or relatively short, determined by the normal speed of the powder, atmospheric conditions, etc. This result is accomplished by utilizing the energy developed by the explosion for actuating the shutter, so that it is immaterial, within the speed variations indicated, whether the explosion is prompt or sluggish as the shutter is not operated until after the explosition takes place, and at an instant when the flash has attained maximum luminosity.

The invention may be variously utilized for indoor and outdoor work, the outdoor adaptations being especially well suited for photographing wild animals, in such use the apparatus being set in a location frequented by animals of which photographs are desired, with a bait or trip-wire so located that a pull thereon will operate the flash producer, and with the camera properly focused the ensuing flash causes a perfect exposure at the instant of maximum light.

In the accompanying drawings, Figure 1 is an elevation of a form of apparatus for outdoor service, being designed primarily for automatically photographing wild animals. Fig. 2 is a sectional elevation of the flash-producing mechanism of Fig. 1, and Fig. 3 is a top plan of the same. Fig. 4 is a sectional elevation of another form of flash-producing apparatus designed primarily for indoor service, and Figs. 5 and 6 are elevations of the same, each of Figs. 4, 5 and 6 illustrating a different means for operating the camera shutter, in all of the adaptations the shutter-operating means being actuated by the explosive energy of the flash producer.

In the construction of Figs. 1, 2 and 3, the support for the flash producer consists of a tubular body 1 which is formed at one side with a bracket 2 having the three spikes $1^a$, $1^b$ and $1^c$ arranged in tripod form for fastening to a tree, post or other support 18, the bracket being made secure by a tie wire 7. The upper end of body 1 is enlarged and of cup form, as indicated at 13, for supporting the flash-producing explosive 16. The latter may be of powder form, as is usual, and may be confined in a paraffin container $16'$ to exclude dampness. The explosive charge may rest on lugs $13'$ in cup 13, being thereby spaced upwardly from the bottom of the cup and projecting above the cup top, as shown in Figs. 1 and 2. The bottom of the cup is grooved at 19 and provided with drain apertures 19' for the purpose of carrying off any water that may be blown into the cup, which if permitted to collect might soak through the paraffin container 16' and destroy the explosive. Adapted to rest on and protect the explosive charge is the downwardly flared cap 3 which is connected by chain 4 to prop 5 of a moisture-proof camera 6, no claim for the latter being made in this application. Prop 5 when in the position shown in Fig. 1 engages the shutter-operating lever 6ᵇ, the shutter being snapped by spring 6ᶜ when the prop is withdrawn.

6ᵃ is the camera lens.

Secured to the bottom of cup 13 is a percussion sparker consisting of a blank cartridge 15 which is adapted to be fired by hammer 14, located within body 1 and secured to the upper end of vertically movable rod 12. This rod and hammer are adapted to be depressed and so held against the action of rod-embracing spring 17 by extremity 10 of the latch lever 9 engaging notch 11 in the rod, as in Fig. 1, the lever being fulcrumed at 10' to bracket 2. The lever is held normally depressed and in engagement with rod 12 by spring 9ᵃ secured to the lower end of bracket 2.

Ordinarily, the apparatus is mounted in close proximity to a place frequented by the animal of which a picture is desired, or a runway or path likely to be traversed by such animal, and a suitable bait is connected to the latch-operating line 49, or the latter may be extended across the path or runway, the camera being of course focused on the point at which line 49 must be operated. A pull on this line resulting from jerking at the bait, or striking the line in the path or runway disengages the latch lever 9 from rod 12, and the upward impulse of the latter caused by spring 17 projects hammer 14 against cartridge 15, and the resulting spark ignites the flash-producing explosive 16. The explosive energy blows off cap 3, as in dotted lines in Fig. 1, and the displacing of the cap instantly removes the shutter prop 5, the apparatus being set with line 4 taut, with the result that the explosive is effected at the moment of maximum light, i. e., after the inception of the explosion and at the instant of its maximum energy and maximum luminosity. These results are obtained regardless of the speed of the explosive, whether fast or slow as those terms are understood in the art. With cap 3 fastened to the support as by staple 8, it is prevented from being blown away and lost.

The forms of apparatus illustrated in Figs. 4, 5 and 6 are designed primarily for indoor service, or at least where they will not be subjected to the elements as with the apparatus of Figs. 1, 2 and 3, which latter may remain out of doors and unattended for days or even weeks at a time. The flash igniting mechanism is the same in each of the three adaptations of Figs. 4, 5 and 6, the differences between these forms being in the means employed for transmitting movement to the shutter. In each of said adaptations the holder for the explosive powder 23 is of stem-like tubular form, as indicated at 20, being adjustably sustained on a supporting rod or standard 21. The upper end of the holder body is of cup form, as indicated at 22, this cup formation extending around the hub-like central part 20' which is, in effect, an upward continuation of the tubular body formation 20. Placed in an aperture in one side of cup 22 is the blank cartridge 24 which is adapted to be fired by the hammer end 25 of lever 26, the latter fulcrumed at 30' on bracket 30 projecting from body 20. For holding lever 26 retracted against the downward pull of spring 32 secured to arm 26' of the lever, a headed latch 27 is fulcrumed at 28 to bracket 29 projecting from body 20, the lower end of spring 32 being secured to the latch as shown and tending to draw it upward and hold its headed extremity in engagement with lever 26. Thus, it will be seen that spring 32 performs the double duty of holding the hammer lever latched in retracted position and also effects the cartridge firing movement thereof when released. The inner extremity of latch 27 is bifurcated as indicated at 28', with a stop pin 29' projecting from bracket 29 between the arms of the bifurcation, thereby limiting both the upward and downward movement of the latch. A wire or cord 27' extends from latch 27, and a pull exerted thereon by the operator serves to release the latch and fire the cartridge, as will be understood.

In the adaptations of Figs. 4, 5 and 6 the means actuated by the explosion of the flash-producing powder for transmitting movement for effecting the operation of the camera shutter is embodied in a rod 32 which is movable vertically in body 20 having the cap-like plate 32' at its upper end which when lowered covers the major portion of the charge, the plate resting on the hub-like part 20' of the body. When the explosion occurs the plate and rod 32 are elevated, as in dotted lines in Fig. 4.

Each of Figs. 4, 5 and 6 shows a different means for causing the elevation of rod 32 to operate the shutter. In Fig. 4 the shutter lever 39 of camera 40 is connected by rod 37 to the core of solenoid 36. One terminal of the core winding extends through a battery 35 and is secured to a contact 33 carried by the lower extremity of rod 32. The other extremity of the core winding is secured to contact 34 secured to the lower extremity of support or body 20. Thus, the instant rod 32 is raised the circuit is closed through engagement of contact 33 and 34, the solenoid is energized, and the inward movement of its core actuates the camera shutter.

In the adaptation shown in Fig. 5, the flexible shutter-operating push wire 50 has the cable 52 in which it operates secured to bracket 51 on the lower extremity of rod 32, and when said rod is elevated by the explosion, wire 50 engages the bottom of support 20 and is pressed downward or inwardly into the cable and the shutter is operated.

In the adaptation of Fig. 6, plunger 60 at the lower extremity of rod 32 operates in cylinder 61 depending from the bottom of support 20, and when the explosion occurs the sudden upward movement of the piston produces air pressure in a flexible tube 63 leading to the camera, said tube being connected to the cylinder at 62, and the shutter is operated as with the familiar type of shutter-operating hand bulb. The push-wire shutter-operating mechanism of Fig. 5 and the compressed air operating mechanism of Fig. 6 are so well understood in the art that detail illustration and description are deemed unnecessary.

It will be understood that the operating line 49 of the adaptation of Figs. 1 and 2, and the pull wire or cord 27' of the constructions shown in Figs. 4, 5 and 6, may be operated interchangeably either by hand or by the object to be photographed, in the latter use it being only necessary to extend and direct the pull line in such manner that when operated the object actuating it will be within the range of the camera. The mechanism shown in Fig. 1 is not sufficiently flexible to be well adapted for use other than wild animal photography. Whereas, in the other adaptations the electric circuit wires of Fig. 4, flexible cable of Fig. 5, and the rubber hose of Fig. 6, permit of the camera being variously positioned with reference to the flash producer. While the flash-producing mechanism of Figs. 4, 5 and 6 may well be used out of doors, its open powder container is not protected from rain, snow, etc., as is the cap-covered construction of Figs. 1 and 2.

It will be seen, however, that in each and all of the adaptations the underlying principle of the invention is present, viz., utilizing the energy generated by the flash-producing explosion for instantly operating the shutter, with the result that the latter is operated when the flash is at its maximum brilliancy, and this quite regardless of whether, due to climatic or other conditions, the explosive is slow or fast.

I claim:

1. The combination of a support for a flash-producing explosive, explosive igniting means, and movable camera shutter-tripping means adapted to be impelled by the explosive force of the flash producer.

2. The combination of a support for a flash-producing explosive, explosive igniting means, camera shutter-actuating means, and means energized by the explosive force of the flash producer for releasing the shutter-actuating means.

3. The combination of a support for a flash-producing explosive, an impelled spark producer for igniting the explosive, releasable means for holding the spark producer out of sparking position, and camera shutter-tripping means energized by the explosive force of the flash producer.

4. The combination of a support for a flash-producing explosive, an impelled spark producer for igniting the explosive, a trip device for preventing the producer from making a spark-producing impulse, means for releasing the trip device, a movable device adapted to be energized by the explosion, a camera shutter, and means made operative by the movement of said device for tripping the shutter.

5. The combination of a support for a flash-producing explosive, a percussion spark producer for igniting the explosive, an impelled hammer adapted when released to strike the percussion device, trip means for holding the hammer retracted and for releasing the same, and camera shutter-tripping means energized by the explosive force of the flash producer.

6. The combination of a holder for a flash-producing explosive, a spark producer for igniting the explosive, a spring-impelled device for actuating the spark producer, a movable latch for holding said device retracted against the pressure of its impelling spring, an operating line connected to the latch, and camera shutter-tripping means energized by the explosive force of the flash producer.

7. The combination of a support for a flash-producing explosive, explosive igniting means, a device adapted to be moved relatively to the support by the force of the explosion, camera-shutter tripping means, and means actuated by said explosion-impelled device for actuating the tripping means.

8. The combination of an open support for a flash-producing explosive, explosive igniting means, a movable device normally located at the open portion of the support and adapted to be impelled by the force of the explosion, and camera-shutter tripping means operatively connected to said device and adapted to be actuated by the explosion-produced movement of said device.

9. The combination of an open-top support for a flash-producing explosive, explosive igniting means, a movable device normally located at the open portion of the support and adapted to be impelled by the force of the explosion, a rod extending from and movable with said device, an abutment, and a camera-shutter tripping push wire connected to the rod and adapted to be projected against said abutment by the movement of said rod.

10. The combination of an open-top support for a flash-producing explosive, the support having a downwardly extending tubular portion with the lower extremity thereof comprising an abutment, explosive igniting means, a movable device normally located at the open portion of the support and adapted to be impelled by the force of the explosion, a rod secured to said device and extending downwardly through the tubular portion of the support, and a camera-shutter tripping push wire connected to the rod and adapted to be projected against said abutment by the movement of said rod.

In testimony whereof I affix my signature in presence of two witnesses.

WM. NESBIT.

Witnesses:
  CHARLES W. BROWER,
  CLARENCE H. ALEXANDER.